(12) United States Patent
Lee

(10) Patent No.: US 9,779,055 B2
(45) Date of Patent: Oct. 3, 2017

(54) INTEGRATED CIRCUIT DEVICE AND SIGNAL PROCESSING METHOD IN INTEGRATED CIRCUIT DEVICE

(71) Applicant: SAMSUNG SDS CO., LTD., Seoul (KR)

(72) Inventor: Joon-Ho Lee, Yongin-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 304 days.

(21) Appl. No.: 14/536,213

(22) Filed: Nov. 7, 2014

(65) Prior Publication Data

US 2015/0347346 A1 Dec. 3, 2015

(30) Foreign Application Priority Data

May 29, 2014 (KR) .................. 10-2014-0064901

(51) Int. Cl.
*G06F 13/42* (2006.01)
*G06F 9/445* (2006.01)
*G06F 1/24* (2006.01)
*G06F 11/07* (2006.01)
*G06F 9/44* (2006.01)

(52) U.S. Cl.
CPC ............ *G06F 13/4221* (2013.01); *G06F 1/24* (2013.01); *G06F 9/44505* (2013.01); *G06F 11/07* (2013.01); *G06F 11/0706* (2013.01); *G06F 11/0757* (2013.01); *G06F 11/0766* (2013.01); *G06F 9/442* (2013.01)

(58) Field of Classification Search
CPC ........ G06F 13/4221; G06F 1/24; G06F 8/442; G06F 8/44505; G06F 11/07; G06F 11/0706; G06F 11/0757; G06F 11/0766
See application file for complete search history.

(56) References Cited

U.S. PATENT DOCUMENTS

| | | | | |
|---|---|---|---|---|
| 6,134,665 A | * | 10/2000 | Klein | G06F 1/3209 709/200 |
| 6,286,111 B1 | * | 9/2001 | Snover | G06F 11/0709 370/403 |
| 2003/0163765 A1 | * | 8/2003 | Eckardt | G06F 11/2284 714/36 |
| 2012/0290870 A1 | * | 11/2012 | Shah | G06F 21/10 714/4.11 |

* cited by examiner

*Primary Examiner* — Eric Oberly
(74) *Attorney, Agent, or Firm* — Sughrue Mion, PLLC

(57) ABSTRACT

An integrated circuit device has a first processing unit, a second processing unit, an external interface, and a control program controlling the first processing unit and the second processing unit, and in communication with the external interface. The first processing unit is configured to respond to a reset signal from the external interface by transmitting an answer-to-reset (ATR) to the external interface. When the first processing unit implements an initialization process, the control program makes a determination as to whether a shutdown state flag is set. In response to detecting the shutdown state flag set, the control program controls the second processing unit to transmit to the external interface diagnostic data of the integrated circuit device.

13 Claims, 3 Drawing Sheets

INTEGRATED CIRCUIT DEVICE AND SIGNAL PROCESSING METHOD IN INTEGRATED CIRCUIT DEVICE

CROSS-REFERENCE TO RELATED APPLICATION

This application claims priority to and the benefit of Korean Patent Application No. 10-2014-0064901, filed on May 29, 2014, the disclosure of which is incorporated herein by reference in its entirety.

BACKGROUND

1. Field

Apparatuses consistent with example embodiments relate to an integrated circuit device and signal processing technology in the integrated circuit device.

2. Discussion of Related Art

ISO/IEC 7816-3 defines the standard for a response when a reset signal from an interface device (IFD) is applied to an integrated circuit (IC) chip. According to the standard, if the reset signal is received while power and a clock are being supplied to the IC chip, the IC chip needs to transmit an answer-to-reset (ATR) signal to the interface device within 400 to 40,000 clock cycles. The ATR signal is a string of 32 or fewer bytes. If the ATR signal is not output by the IC chip within that specified period, the interface device deactivates communication with the IC chip.

Some IC's, however, have a tamper-resistant device (TRD) feature. A TRD IC chip is configured so that any code stored in its internal non-volatile memory (NVM) cannot be read. Therefore, when a TRD IC chip is shut down, it is difficult to diagnose the cause for the chip's shutdown and therefore difficult to verify the integrity of the main code. Likewise, even in the situation in which a specific code is intentionally inserted into an IC chip for the sake of identifying intellectual property in the IC chip or the like, the TRD feature prevents such a code from being read, even through an external interface.

SUMMARY

Example embodiments according to the present disclosure facilitate determining the cause of a shutdown, or other information required from an integrated circuit device when the integrated circuit device is in a shutdown state. On the other hand, even though one or more example embodiments may ameliorate the disadvantage mentioned above, and other disadvantages not described above, it is understood that one or more example embodiments consistent with this disclosure need not necessarily overcome or even address the disadvantage described above.

An integrated circuit device has a first processing unit, a second processing unit, an external interface, and a control program controlling the first processing unit and the second processing unit, and in communication with the external interface. The first processing unit is configured to respond to a reset signal from the external interface by transmitting an answer-to-reset (ATR) to the external interface. When the first processing unit implements an initialization process, the control program makes a determination as to whether a shutdown state flag is set. In response to detecting the shutdown state flag set, the control program controls the second processing unit to transmit to the external interface diagnostic data of the integrated circuit device.

In an example embodiment, the control program controls the second processing unit to wait for a set response waiting time to elapse prior to the transmitting of the diagnostic data.

In another example embodiment, the set response waiting time is from 2 times to 10 times a maximum allowed response time of the ATR.

In yet another example embodiment, the diagnostic data includes a flag related to a cause of shutdown of the integrated circuit device, or an integrity verification value of a predetermined portion of code included in the integrated circuit device.

In still another example embodiment, the second processing unit stores information indicating a location of the predetermined portion of code.

According to an example embodiment, the control program controls the second processing unit to calculate the integrity verification value in response to determining that the shutdown state flag is set.

According to another example embodiment, the control program controls the second processing unit to calculate the integrity verification value when power is initially applied to the integrated circuit device.

According to yet another example embodiment, the second processing unit calculates the integrity verification value as a hash value of the portion of the code, or a value of the portion of the code that is encrypted using a predetermined symmetric key or public key.

In an example embodiment, there is provided a signal processing method of an integrated circuit device. The method includes receiving a reset signal from an external interface; determining whether the integrated circuit device is in a shutdown state; and automatically transmitting diagnostic data of the integrated circuit device to the external interface when the integrated circuit device is in the shutdown state.

In another example embodiment, the transmitting diagnostic data further includes, waiting for a lapse of a set response waiting time before transmitting the diagnostic data to the external interface.

In still another example embodiment, the response waiting time for the diagnostic data is from 2 times to 10 times a maximum allowed response time of an ATR.

Furthermore, in an example embodiment, the diagnostic data includes a flag related to a cause of shutdown of the integrated circuit device; or an integrity verification value of a predetermined portion of a code included in the integrated circuit device.

In yet another example embodiment, the transmitting of the diagnostic data further includes calculating the integrity verification value of the portion of the code in response to a determination that the integrated circuit device is in the shutdown state.

According to an example embodiment, the transmitting of the diagnostic data is performed when power is initially applied to the integrated circuit device, and the calculated integrity verification value of the portion of the code is included in the diagnostic data.

In an example embodiment, the integrity verification value is a hash value of the portion of the code; or a value of the portion of the code that is encrypted using a predetermined symmetric key or public key.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, example embodiments consistent with the present disclosure will be described with reference to the drawings. The following detailed description is provided to help comprehensive understanding of methods, devices, and/or systems described in this specification. However, these are only examples, and the present disclosure is not limited thereto.

In the description below, when it is determined that detailed descriptions of related well-known functions unnecessarily obscure the gist of the present disclosure, detailed descriptions thereof will be omitted. Some terms described below are defined by considering functions in the present disclosure and meanings may vary depending on, for example, a user or operator's intentions or customs. Therefore, the meanings of terms should be interpreted based on the scope throughout this specification. The terminology used in detailed description is provided only to describe the example embodiments and not for purposes of limitation. Unless the context clearly indicates otherwise, the singular forms include the plural forms. It will be understood that the terms "comprises" or "includes" when used herein, specify some features, numbers, steps, operations, elements, and/or combinations thereof, but do not preclude the presence or possibility of one or more other features, numbers, steps, operations, elements, and/or combinations thereof in addition to the description. Likewise, the description of an example embodiment in terms of a combination of elements does not preclude the implementation of a suitable subcombination of elements.

Figure 1:
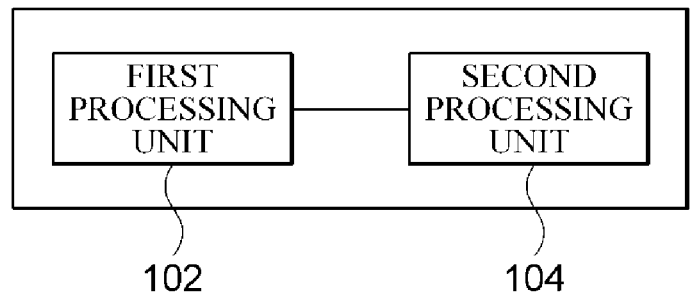
FIG. 1 is a block diagram illustrating an integrated circuit device 100 according to an example embodiment.

FIG. 1 is a block diagram illustrating an integrated circuit device 100 according to an example embodiment. As illustrated, the integrated circuit device 100 according to the example embodiment includes a first processing unit 102 and a second processing unit 104.

The first processing unit 102 responds to a reset signal (applied from an external interface (IFD)) by performing initialization and by transmitting to the external interface an answer-to-reset (ATR).

During the initialization of the first processing unit 102, if it is determined that the integrated circuit device 100 is in a shutdown state (i.e., a state in which the IC 100 is to shut down), the second processing unit 104 responds to this determination by transmitting diagnostic data on the integrated circuit device 100 to the external interface.

The manner in which the integrated circuit device 100 responds to receiving the reset signal, in the above-identified example embodiment, will now be described in more detail with reference to FIG. 2.

Figure 2:
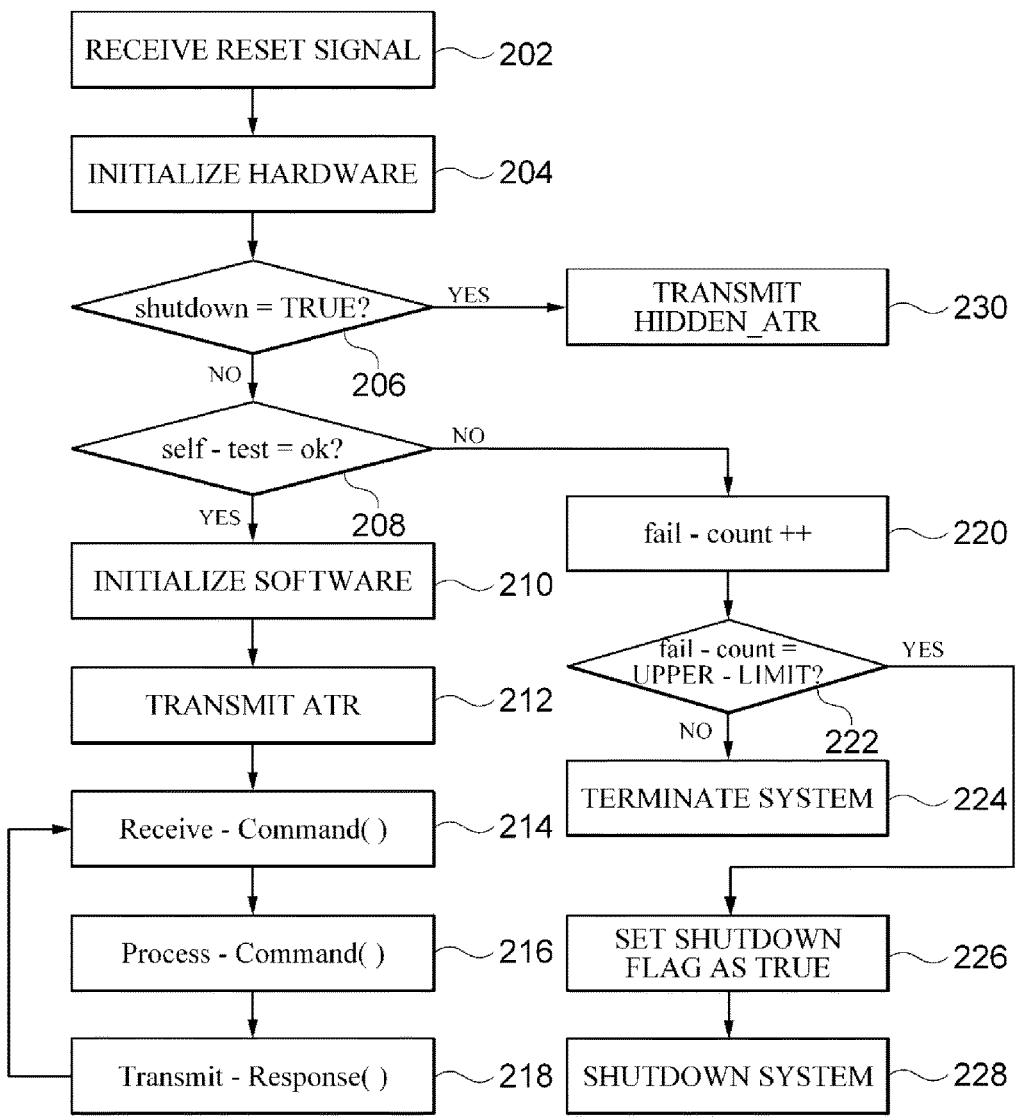
FIG. 2 is a flowchart illustrating a signal processing method 200 of an integrated circuit device according to an example embodiment.

FIG. 2 is a flowchart illustrating a signal processing method 200 in the integrated circuit device 100 according to an example embodiment. While the example embodiment illustrates that the series of operations are performed sequentially, it should be noted that at least some operations may be simultaneously performed or performed in a different order.

In operation 202, the first processing unit 102 receives the reset signal from the external interface.

In operation 204, the first processing unit 102 responds to the reset signal by initializing the hardware of the integrated circuit device 100.

In operation 206, the first processing unit 102 examines the value of an operating system flag or the like that indicates whether a shutdown state is to be entered (i.e., determines whether the current state is a shutdown state). For example, when the value of the shutdown flag is "TRUE" (i.e., the shutdown flag is set), the first processing unit 102 makes a determination that the current state is the shutdown state.

When it is determined in operation 206 that the current state is not the shutdown state, processing continues with operation 208. In operation 208, the first processing unit 102 performs a self test on a main module, such as a security module included in the integrated circuit device 100. On the other hand, when the determination in operation 206 is that the current state is the shutdown state, processing continues with operation 230, to be discussed further below.

When the self test in operation 208 indicates that there is no problem (i.e., the result is: self_test=OK), then processing continues with operation 210 in which the first processing unit 102 initializes the software. If the self test in operation 208 indicates the presence of a problem, processing continues with operation 220, to be discussed further below.

In operation 212, the first processing unit 102 transmits an ATR signal to the external interface. The ATR signal transmitted in this operation is a standard ATR signal and, in example embodiments, is compliant with ISO/IEC 7816-3 (i.e., is transmitted within 400 to 40,000 clock cycles from the reception time of the reset signal).

When the operations up to operation 212 are successfully performed, the integrated circuit device 100 determines that initialization (reset) is successful, and begins to repeat a normal operation routine such as normally receiving a command from the outside (Receive_Command( )), processing the command (Process_Command( )), and transmitting a result value (Transmit_Response( )) as shown in operations 214 to 218.

Returning to operation 208, when it is determined from the self test that a problem exists, processing continues to operation 220. In operation 220, the first processing unit 102 increases a count (fail_count) by 1 (i.e., increments a fail counter).

For example, when the self test shows that access control of a predetermined security area is disabled, or that an unusual write operation is performed on a non-volatile memory, the first processing unit 102 may determine that there is a problem and set the self-test value to "not ok" or the like. After incrementing the failure count, processing continues to operation 222.

In operation 222, the first processing unit 102 determines whether the count (fail_count) has reached a predetermined threshold (UPPER_LIMIT). If no, processing continues with operation 224 which will be discussed below. If yes, processing continues with operation 216 in which the first processing unit 102 sets the shutdown flag of the operating system as "TRUE" in operation 226. After that, in operation 228, the first processing unit 102 shuts down the system.

When the system is shutdown in this manner, the integrated circuit device 100 restarts in a state in which the shutdown flag is set as "TRUE." In other words, the system knows upon startup that it is restarting immediately after a shutdown. Returning to operation 206, previously discussed in part, when the first processing unit 102 determines that the current state is the shutdown state, processing continues to operation 230. In operation 230, the standard ATR is not transmitted as it was in the operation 212. Instead, in operation 230, the second processing unit 104 transmits diagnostic data of the integrated circuit device to the external interface. In the example embodiments, therefore, it is possible to transmit the diagnostic data via the external interface. According to an example embodiment, such diagnostic data is transmitted as a hidden ATR (HIDDEN_ATR) instead of a standard ATR. Therefore, the cause of the shutdown or other necessary information is transmitted to the external interface even when the IC device is a TRD.

Figure 3:
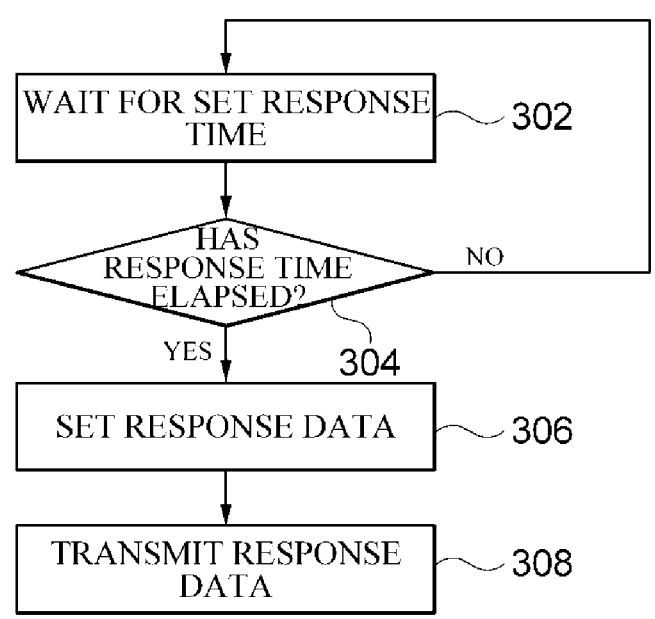
FIG. 3 is a flowchart illustrating a process 230 of transmitting a hidden ATR in the signal processing method 200 of the integrated circuit device in detail according to an example embodiment.

FIG. 3 is a flowchart illustrating in more detail the process of operation 230 for transmitting a hidden ATR in connection with the signal processing method 200 shown in FIG. 2 according to an example embodiment.

Turning now to FIG. 3, the more detailed view of operation 230 is illustrated according to an example embodiment. Operations 302 and 304 effect a wait loop. In these operations, the second processing unit 104 waits until a set time for waiting for the diagnostic data has elapsed. In this example embodiment, the response waiting time is set to twice or longer than a maximum allowed response time permitted for transmitting the ATR after the reset signal is received. For example, when the maximum allowed response time is 40,000 clocks, the response waiting time is set to at least 80,000 clocks or more. A sufficient delay time is thus established, after the expiration of the maximum allowed response time, so that the external interface may clearly distinguish between the standard ATR and the hidden ATR which contains the diagnostic information or the like. In other words, by transmitting the hidden ATR after the lapse of a sufficient delay time during which a standard ATR would have been transmitted, the second processing unit 104 uses the ATR mechanism to output diagnostic data without harming compatibility with any standard related to a reference ATR response. The use of the ATR mechanism is thus referred to in example embodiments as the transmission of a hidden ATR.

Also, according to example embodiments, the second processing unit 104 sets a maximum value of the response waiting time for the diagnostic data. According to one example embodiment, the maximum value is 10 times the maximum allowed response time. In this example embodiment, when the hidden ATR is not received until the external interface has waited for a time corresponding to the maximum value, it is determined that the integrated circuit device 100 does not operate normally.

Returning to FIG. 3, in operation 306, diagnostic data to be transmitted is recorded in a buffer. In an example embodiment, the diagnostic data includes at least a flag related to a cause of shutdown (i.e., a shutdown cause flag) of the integrated circuit device 100 and/or an integrity verification value of a predetermined portion of a code included in the integrated circuit device 100.

According to an example embodiment, the shutdown cause flag is a short string having different values assigned for each cause of shutdown of the integrated circuit device 100. According to an example embodiment, the length of the shutdown cause flag is 1 byte or less. In this example embodiment, therefore, the time between a shutdown time of the integrated circuit device 100 and a time in which communication with the external interface is deactivated is very short. On the other hand, when the length of the shutdown cause flag is 2 bytes or more, there is an increased likelihood that the storage of the shutdown cause flag will fail due to an interruption in the power being supplied.

Also, according to another example embodiment, the integrity verification value permits a determination as to whether a binary sequence of code that should not be changed in the integrated circuit device 100, or code protected as an intellectual property, has been changed. In an example embodiment, the second processing unit 104 stores, in advance, an offset value and a start point of the storage location of the code that needs integrity verification in the integrated circuit device 100. According to this example embodiment, the second processing unit 104 reads the code in a corresponding location as necessary, and calculates an integrity verification value therefrom. For example, the second processing unit 104 may set as the integrity verification value a hash value calculated using a one-way hash function (for example, SHA-1, SHA-224, and SHA-256) of the code, a value obtained by calculating a message authentication code (MAC) based on a symmetric key (for example, DES, AES, SEED, and ARIA), or an electronic signature based on a public key (for example, RSA, DSA, ECDSA, KCDSA, and KCECDSA).

According to this example embodiment, in this case, the process of calculating the integrity verification data value in the IC Chip needs to be performed at least once. For example, according to one example embodiment, the encryption operation is performed when power is initially applied.

Returning yet again to operation 306 of FIG. 3, when it is determined that the integrated circuit device 100 is in the shutdown state, the second processing unit 104 in an example embodiment calculates the integrity verification value of the code stored in the predetermined storage location. Also, according to example embodiments, when power is initially applied to the integrated circuit device 100, the second processing unit 104 is also configured to calculate the integrity verification value of the code stored in the storage location. According to further example embodiments, the time at which the calculating of the integrity verification value occurs under other circumstances as well.

In operation 308, the second processing unit 104 transmits the diagnostic data stored in the buffer to the external interface.

According to example embodiments, when the integrated circuit device 100 is shut down, the second processing unit 104 upon restart transmits the hidden ATR including various pieces of diagnostic information at a time that is sufficiently later than a standard ATR so that the external interface distinguishes the ATR from the hidden ATR, and can thereby diagnose a cause of the shutdown, determine the integrity verification data value of the main code, and detect use of the code having an intellectual property. In this case, since the hidden ATR is not recognized as the standard IFD, general users do not recognize the presence of the hidden ATR, and there is no conflict with an existing standard. Also, since the code stored in an internal non-volatile memory is not be modified after the integrated circuit device 100 is provided to the user, it is possible to detect infringement of the intellectual property by determining the integrity verification data value of the main code.

According to example embodiments, when the integrated circuit device is in a shutdown state, separate diagnostic data is transmitted from the integrated circuit device. Therefore, a cause of the shutdown or other information required by a user is obtained.

Also, according to example embodiments, the diagnostic data is transmitted from the integrated circuit device at a time that is sufficiently later than a standard ATR. Therefore, compatibility with an existing protocol is ensured as well as the provision of necessary information.

Meanwhile, the example embodiment may include a computer readable recording medium including a program for executing methods described in this specification in a computer. The computer readable recording medium may include a program instruction, a local data file, and a local data structure, and/or combinations and subcombinations thereof. The medium may be specially designed and prepared for the present disclosure or a generally available medium in the field of computer software may be used. Examples of the computer readable recording medium include magnetic media such as a hard disk, a floppy disk, and a magnetic tape, optical media such as a CD-ROM and a DVD, magneto-optical media such as a floptical disk, and a hard device such as a ROM, a RAM, and a flash memory, that is specially made to store and perform the program instruction. Examples of the program instruction may include a machine code generated by a compiler and a high-level language code that can be executed in a computer using an interpreter. Furthermore, the example embodiments shown in FIGS. 2 and 3 also embody algorithms implemented, in a concrete sense, as a control program of an integrated circuit. According to example embodiments, the first processing unit 102 and the second processing unit 104 each have their own respective control programs. In other example embodiments, the processing units 102 and 104 are controlled by a common control program. Likewise, both processing units have their own respective processors according to one example embodiment, and are implemented on the same processor according to another example embodiment. Such control programs in example embodiments are stored as firmware, microcode, or the like, or are programmed into the integrated circuit as in the case of an example embodiment implemented by a FGPA or similar.

While the present disclosure has been described above in detail with reference to representative embodiments, it is understood by those skilled in the art that the embodiment may be variously modified without departing from the scope of the present disclosure. Therefore, the scope of the present disclosure is defined not by the described embodiment but by the appended claims, and encompasses equivalent that fall within the scope of the appended claims.

What is claimed is:

1. An integrated circuit device, comprising:
    a first processing unit;
    a second processing unit;
    an external interface; and
    a control program controlling the first processing unit and the second processing unit, and in communication with the external interface;
    wherein:
    the first processing unit is configured to respond to a reset signal from the external interface by transmitting an answer-to-reset (ATR) to the external interface; and
    when the first processing unit implements an initialization process, the control program makes a determination as to whether a shutdown state flag is set;
    in response to detecting the shutdown state flag set, the control program controls the second processing unit to transmit to the external interface diagnostic data of the integrated circuit device,
    wherein the control program controls the second processing unit to transmit the diagnostic data to the external interface after waiting for a set response waiting time from receiving the reset signal, so that the external interface distinguishes between the ATR and the diagnostic data based on a waiting time.

2. The device according to claim 1, wherein the set response waiting time is from 2 times to 10 times a maximum allowed response time of the ATR.

3. The device according to claim 1, wherein the diagnostic data includes at least one of:
    a flag related to a cause of shutdown of the integrated circuit device, and
    an integrity verification value of a predetermined portion of code included in the integrated circuit device.

4. The device according to claim 3, wherein the second processing unit stores information indicating a location of the predetermined portion of code.

5. The device according to claim 4, wherein the control program controls the second processing unit to calculate the integrity verification value in response to determining that the shutdown state flag is set.

6. The device according to claim 4, wherein the control program controls the second processing unit to calculate the integrity verification value when power is initially applied to the integrated circuit device.

7. The device according to claim 3, wherein the second processing unit calculates the integrity verification value as one of:
    a hash value of the portion of the code; and
    a value of the portion of the code that is encrypted using a predetermined symmetric key or public key.

8. A signal processing method of an integrated circuit device, comprising:
    receiving a reset signal from an external interface;
    determining whether the integrated circuit device is in a shutdown state; and
    automatically transmitting diagnostic data of the integrated circuit device to the external interface when the integrated circuit device is in the shutdown state,
    wherein the transmitting diagnostic data comprises waiting for a set response waiting time from receiving the reset signal before transmitting the diagnostic data to the external interface, so that the external interface distinguishes between an answer-to-reset (ATR) and the diagnostic data based on a waiting time.

9. The method according to claim 8, wherein the response waiting time for the diagnostic data is from 2 times to 10 times a maximum allowed response time of an ATR.

10. The method according to claim 8, wherein the diagnostic data includes at least one of:
    a flag related to a cause of shutdown of the integrated circuit device; and
    an integrity verification value of a predetermined portion of a code included in the integrated circuit device.

11. The method according to claim 10, wherein the transmitting of the diagnostic data further includes calculating the integrity verification value of the portion of the code in response to a determination that the integrated circuit device is in the shutdown state.

12. The method according to claim 10, wherein:
the transmitting of the diagnostic data is performed when power is initially applied to the integrated circuit device, and
the calculated integrity verification value of the portion of the code is included in the diagnostic data.

13. The method according to claim 10, wherein the integrity verification value is one of:
a hash value of the portion of the code; and
a value of the portion of the code that is encrypted using a predetermined symmetric key or public key.

* * * * *